United States Patent

Kennedy, III

[11] Patent Number: 5,494,643
[45] Date of Patent: Feb. 27, 1996

[54] METHOD AND APPARATUS FOR OPTIMIZING CONTROL OF AN IMMOBILIZED FILM PHOTOREACTOR

[75] Inventor: James C. Kennedy, III, Albuquerque, N.M.

[73] Assignee: University of New Mexico, Albuquerque, N.M.

[21] Appl. No.: 416,264

[22] Filed: Apr. 4, 1995

[51] Int. Cl.$^6$ ................................................ B01J 19/12
[52] U.S. Cl. ...................... 422/186.3; 422/906; 422/186
[58] Field of Search ................................ 422/186, 906, 422/186.3

[56] References Cited

U.S. PATENT DOCUMENTS

| | | | |
|---|---|---|---|
| 4,887,005 | 12/1989 | Rough et al. | 315/111.21 |
| 4,892,712 | 1/1990 | Robertson et al. | 422/186 |
| 4,954,320 | 9/1990 | Birmingham et al. | 422/186.04 |
| 4,966,759 | 10/1990 | Robertson et al. | 422/186 |
| 4,969,991 | 11/1990 | Valadez | 210/96.2 |
| 5,045,288 | 9/1991 | Raupp et al. | 422/186.3 |
| 5,053,136 | 10/1991 | Miano et al. | 210/650 |
| 5,069,885 | 12/1991 | Ritchie | 422/186 |
| 5,118,422 | 6/1992 | Cooper et al. | 210/636 |
| 5,126,111 | 6/1992 | Al-Ekabi et al. | 422/186.3 |
| 5,130,031 | 7/1992 | Johnston | 210/748 |
| 5,174,877 | 12/1992 | Cooper et al. | 204/193 |
| 5,302,356 | 4/1994 | Shapman et al. | 422/186.3 |
| 5,308,458 | 5/1994 | Urwin et al. | 204/157.6 |
| 5,445,800 | 8/1995 | Isoda et al. | 422/186.3 |

OTHER PUBLICATIONS

K. Vinodgopai et al., "Electrochemically Assisted Photocatalysis. $TiO_2$ Particulate Film Electrodes for Photocatalytic Degradation of 4–Chlorophenol," 97 J. Phys, Chem. pp. 9040–9044 (1993).

Primary Examiner—Donald P. Walsh
Assistant Examiner—Daniel Jenkins
Attorney, Agent, or Firm—Ray Wilson

[57] ABSTRACT

In a photocatalysis system for degrading toxic compounds to constituent components, an improved photoreactor system optimizes reaction rates on the surface of a wide bandgap semiconductor electrode material. The semiconductor material has a first surface exposed to light having a higher energy than the bandgap and a second surface exposed to the toxic compound. An electrical conductor contacts the semiconductor electrode material in a geometry effective to produce an electric field within the semiconductor material. A controlled voltage source is connected to the electrical conductor for applying a voltage bias effective to produce the electric field. A closed circuit current sensor or an open circuit voltage sensor is connected to the electrical conductor and outputs a current or voltage signal, respectively, that is indicative of an excess electrical charge in the semiconductor material. A processor monitors the current or the voltage signal and controls the voltage source to minimize the excess electrical charge.

20 Claims, 1 Drawing Sheet

METHOD AND APPARATUS FOR OPTIMIZING CONTROL OF AN IMMOBILIZED FILM PHOTOREACTOR

BACKGROUND OF THE INVENTION

This invention relates to photocatalysis and, more particularly, to the control of photoreactors that catalyze the oxidation of organic compounds.

Photocatalysis is a process that involves illuminating a wide bandgap semiconductor with light having an energy greater than the semiconductor bandgap and then exposing the surface of the semiconductor material to organic compounds. In many cases, the result is oxidation of the organic compound to harmless components, e.g., $H_2O$ and $CO_2$. Many types of semiconducting compounds and mixtures thereof have been found to have varying degrees of efficiency. For example, $TiO_2$, $SnO_2$, $ZNO$, $WO_3$, and $SrTiO_3$ have been found to be effective photocatalysts. $TiO_2$ has been found to be the most effective in terms of photoactivity, photostability and cost, but the following discussion is not limited to $TiO_2$.

As used herein, the use of the term "photocatalyst" means any compound in which irradiation of the compound with electromagnetic radiation of visible or ultraviolet wavelength will result in conduction band electrons and valence band holes that can undergo redox reactions at the catalyst surface with species such as water or inorganic and organic compounds. The illuminating light has an energy higher than the band gap of the semiconductor (e.g., generally in the ultraviolet (UV), i.e., <385 nm for anatase $TiO_2$).

The major photocatalysis application consists of treatment of aqueous or gaseous waste streams to eliminate toxic components. Photocatalysis has been carried out in the form of fine particles dispersed in the aqueous solutions and immobilized films exposed to aqueous or gaseous streams. The present invention is directed to immobilized film photoreactors.

In immobilized film systems, semiconductor films have been immobilized onto UV transparent or glass substrates of various geometries. For instance, films have been immobilized on the inside surface of an annulus of UV transparent support where the light source is from within or without the annulus and glass or UV transparent tubing wound around the light source in a spiraling manner. The following discussion is not limited to a particular geometry except as expressly set out in the discussion.

The physical processes associated with photocatalysis are generally understood. Typically, electron-hole pairs are created within the semiconductor and are transported to the interface of the semiconductor and treatment stream. Both oxidation and reduction reactions occur at the interface by transfer of electrons from the semiconductor to an oxidant and holes to a reductant. Organic molecules that are oxidized to less harmful constituents are hereinafter referred to as reductants. The oxidant, or electron acceptor, can be a variety of substances, including hydrogen peroxide, but is typically free oxygen ($O_2$) in most systems. In oxidation reactions of organic materials to less harmful constituents, the hole in an electron-hole pair can be transferred to surface hydroxyls or directly to adsorbed organics. Surface hydroxyl radicals can further attack adsorbed or non-adsorbed organic species at or near the surface of the semiconductor. As used herein, the term "oxidant" refers to a reactant that is reduced by electron transfer from the semiconductor. "Reductant" refers to a reactant that is oxidized by hole transfer from the semiconductor.

The most efficient use of absorbed light occurs when the rates of oxidation and reduction are equal. Under these conditions, surface charging is minimized and recombination processes within the semiconductor are minimized. Under most conditions, the reduction reaction, or transfer of an electron to free oxygen, is the slowest occurring process. As a result, a negative charge caused by excess electrons accumulates within the semiconductor leading to increased electron-hole recombination rates and less efficient hole transfer. In oxidation reactions, the notion of photonic efficiency relates to the ratio of oxidation events to the incident number of photons on the semiconductor surface. In terms of effectively utilizing incident photons, photonic efficiency is maximized when surface charging is minimized. Therefore, removal of the excess photogenerated charge of the nonproductive majority carrier (electrons, in the case of an n-type conducting photocatalyst applied to oxidation reactions) maximizes the photonic efficiency.

Some of the difficulties present in photocatalytic systems include the unpredictability of the reaction rates under varying conditions of light intensity, reactant concentrations and reactant types. Different reactants adsorb to the surface of the photocatalyst to different extents thereby influencing reaction rates. For instance, a reactant that adsorbs less well to the catalyst surface may have a lower reaction rate. At high concentrations of organic materials, the kinetics or rate of reaction may be increasingly independent of the organic concentration. Under these circumstances, the reaction rate is primarily controlled by reduction reactions. Oxidation-reduction rates may be increased by increasing the mass transport rate of reactants to the catalyst surface or the amount of reactant adsorbed on the surface of the catalyst. In flow reactors with immobilized films, increasing the flow rate or concentration can increase mass transport rates. Increased concentrations in the feed stream can also increase the amount of reactant adsorbed on the catalyst surface if the reactant follows langmuirian behavior. Note that, hereinafter, the feed rate is defined as the molar flow rate, and is the product of the concentration and volumetric flow rate. Therefore, the feed rate can be adjusted either by adjusting concentration, flow rates, or both. Likewise, under otherwise fixed operating parameters, increasing the light intensity will increase the reaction kinetics, but at an increasingly slower rate. Additionally, the concentration at which the reaction rate is independent of the organic concentration will vary depending on the light intensity.

It has been shown by K. Vinodgopai et al., "Electrochemically Assisted Photocatalysis. $TiO_2$ Particulate Film Electrodes for Photocatalytic Degradation of 4-Chlorophenol," 97 J. Phys. Chem., pp. 9040–9044 (1993) that photooxidation rates can be enhanced by applying an anodic bias to an n-type semiconductor in an electrochemical cell configuration. In particular, Vinodgoapi shows that photocatalytic degradation occurs at a faster rate with the applied potential maintained at +0.6 V while little degradation occurs when the potential is maintained around −0.6 V. There is no suggestion on how to usefully apply this result to a photocatalytic process.

Accordingly, it is an object of the present invention to control the voltage bias applied to the photocatalytic film to minimize the recombination rates of electron-hole pairs by enhancing charge separation.

Another object of the present invention is to monitor and adjust process parameters to minimize excess charge buildup on the surface of the photocatalyst.

One other object of the present invention is to adapt computer process control to monitor and adjust process parameters to minimize excess charge buildup.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention may comprise, in a photocatalysis system for degrading a toxic compound to constituent components, an improved photoreactor control system for increased reaction rates on the surface of a wide bandgap semiconductor material exposed to light having a higher energy than the bandgap and a surface exposed to the toxic compound. An electrical conductor contacts the semiconductor material in a geometry effective to produce an electric field within the semiconductor material. A controlled voltage source is connected to the electrical conductor for applying a voltage bias effective to produce the electric field. A closed loop current sensor or open circuit voltage sensor, is connected to the electrical conductor for outputting a current or voltage signal under conditions of applied bias that is indicative of excess electronic charge within the photocatalyst surface. A processor monitors the current or voltage signal and controls the voltage source to minimize excess electrical charge. Suitable control parameters include stream flow rate, reductant concentration, oxidant concentration, and light intensity.

In another characterization of the present invention, in a photocatalysis system for degrading a toxic compound to constituent components, an improved process for photoreactor control optimizes reaction rates on the surface of a wide bandgap semiconductor material exposed to light having a higher energy than the bandgap and a surface exposed to the toxic compound. The semiconductor material is contacted with an electrical conductor in a geometry effective to produce an electric field within the semiconductor. One or more associated parameters of the photocatalysis system that affect excess electronic charge within the semiconductor is controlled. A closed circuit current signal or an open circuit voltage signal from the electrical conductor indicative of the excess charge present in the semiconductor is sensed and monitored in a processor. One or more control signals is outputted to the one or more controllers to adjust the associated parameters to minimize excess electrical charge.

In yet another characterization of the present invention, in a photocatalysis system for degrading a toxic compound to constituent components, an improved photoreactor optimizes reaction rates on the surface of a wide bandgap semiconductor material exposed to light having a higher energy than said bandgap and a surface exposed to said toxic compound. An electrical conductor contacts the semiconductor material in a geometry effective to produce an electric field within the semiconductor material in response to an applied voltage bias.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

The process parameters needed to achieve an optimized energy efficient photoreactor for photocatalysis will vary from system to system and cannot be predicted. For example, light intensity, mass transfer rates of reactants (influenced by flow rates and reactant concentrations), or surface adsorption kinetics (influenced by type of reactant and reactant concentration) will affect in a complex interrelated manner the electric field within a photocatalytic semiconductor needed to achieve maximum degradation rates. Note that the use of the term "reactants" refers to both oxidants and reductants. In accordance with the present invention, an integrated photoreactor control system is provided for controlling one or more process parameters, e.g., flow rates, oxidant and reductant feed rates, applied voltage bias levels, light intensity, etc.. A processor, which is preferably a digital computer, monitors photocurrent or open-circuit photovoltage values and varies flow rates, oxidant and reductant feed rates, and light intensities, to maximize degradation rates of target organic reactant material.

A suitable semiconductor material is placed in contact with an electrical conductor wherein a voltage bias applied to the conductor produces an electric field along the semiconductor (e.g., parallel to a UV transparent substrate that supports the semiconductor) or through the semiconductor (e.g., perpendicular to a UV transparent substrate that supports the semiconductor). The processor increases or decreases the applied voltage bias as a function of measured photocurrent or photovoltage produced by the semiconductor in contact with reactants under an applied light source. A maximum photocurrent is sought at a minimum applied voltage bias to optimize the removal of excess electrical charge from the semiconductor it should be noted that for electrode configurations such as shown in FIG. 1, an overly high applied bias could inhibit hole migration to the semiconductor solution interface and inhibit the degradation rate.

Figure 1:
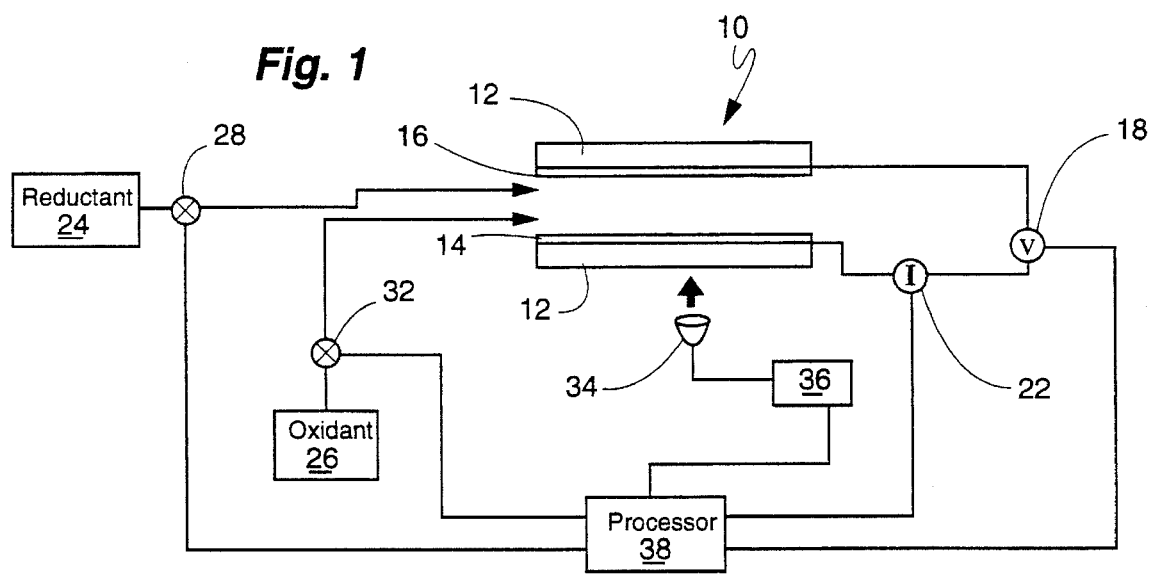
FIG. 1 is a schematic of a photoreactor control system according to one embodiment of the present invention.
Figure 3:
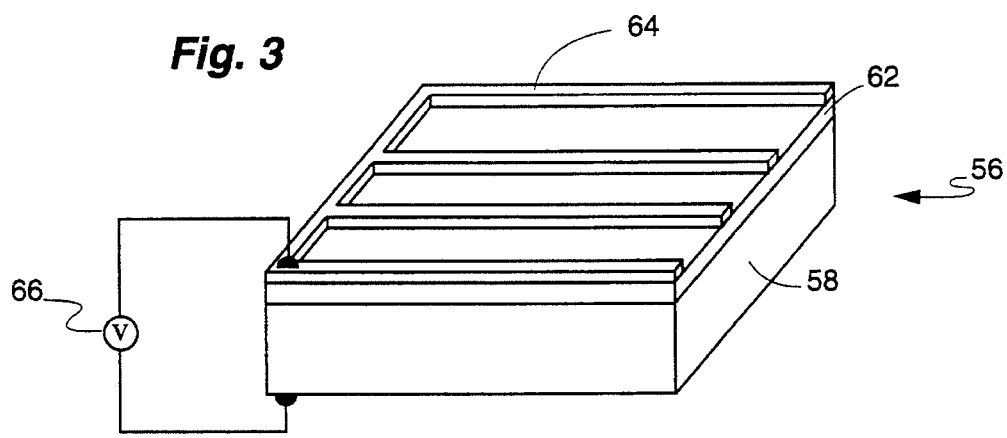
FIG. 3 is a pictorial illustration of a photoreactor according to a second embodiment of the present invention.

FIG. 1 is a schematic illustration of one embodiment of a photoreactor control system according to the invention. Photoreactor 10 can be configured to operate as an isolated film device, such as shown in FIG. 3, and referred to herein as a "type I" system, or as an photoreactor cell configuration, referred to herein as a 637 type II" system. In a type I system an electric field is applied across or through at least one semiconductor electrode, but not across or through a reactant solution. The optimum photocurrent from the semiconductor is a minimum current; in a type II system, the optimum photocurrent is a maximum photocurrent.

A suitable photoreactor cell for use in a type II system shown in FIG. 1, wherein the electric field applied is to two (or more) semiconductor electrodes and across a reactant solution, includes substrate 12 that is transparent to the light having a wavelength effective to form electron-hole pairs within semiconductor film 14. Film 16 can be a metallic film, or a film of another or the same photocatalyst material.

For most semiconductors suitable for photocatalysis, an ultraviolet (UV) wavelength is adequate and, for purposes of illustration, is the exemplary light source herein. As shown in FIG. 1, semiconductor 14 may be $TiO_2$, a preferred semiconductor for its photoactivity, photostability, and cost. Film 16 may be either a metallic film, such as platinum, or another semiconductor, such as $SnO_2$, another photoactive and photostable semiconductor material that is capable of electron transfer to free oxygen ($O_2$).

A voltage bias is applied to semiconductor materials 14 and 16 by a controlled DC voltage source 18. When illuminated by light source 34, semiconductor materials 14 and 16 produce a photocurrent that is monitored by current sensor 22 and open circuit photovoltage that monitored by voltmeter 23. The magnitudes of the photocurrent and photovoltage are related to excess photogenerated charge and to the voltage bias applied to semiconductor materials 14 and 166 by controlled voltage source 18. The voltage bias acts to remove excess electrical charge from semiconductor materials 14 and 16 to increase the oxidation or reduction reactions at the respective semiconductor materials. Detecting a local maximum of sensed photocurrent arising from applied bias is indicative of optimal removal of excess electrical charge. Removal of excess electrical charge results in both increased reaction rates (R) and photonic efficiencies (R/I) at a fixed light intensity (I).

Yet other process parameter controls are used to decrease the excess charge within the semiconductor and achieve optimum reaction rates. Given fixed parameters, such as oxidant and reductant concentrations, adjustment of other parameters, such as flow or light intensity, may be adjusted to maximize sensed photocurrent or photovoltage. This maximization indicates a minimum amount of excess negative charge. As a result, recombination rates are minimized and photonic efficiencies maximized.

The above discussion of maximized photocurrent or photovoltage as indicative of minimum excess negative charge applies to the electrochemical cell photocell 10 configuration (type II system) expressly shown in FIG. 1. If photocell 10 is an isolated film device, as shown in FIG. 3, i.e., a type I system, minimization of photocurrent or photovoltage by increasing oxidant concentrations, for instance, would indicate increased leakage currents by electron transfer to the oxidant and therefore a lower level of excess negative charge. Then, a minimum in sensed photocurrent or photovoltage is sought to optimize oxidant concentrations.

The mass transfer rate of reductant 24 and oxidant 26 are controlled by the concentration of reductant 24 and oxidant 26, e.g., by controlling feed rate through control valves 28 and 32 or by controlling flow rate through a pump (not shown), to control the feed rate of reductant 24 and oxidant 26, respectively. Oxidant 26 is an electron acceptor, such as oxygen, and reductant 24 is an electron donor, such as target organics to be oxidized. Concentrations are adjusted by processor 38 in response to sensed photocurrent 22 to achieve a maximum sensed photocurrent for type II systems and a minimum sensed photocurrent 22 for type I systems. Similarly, the intensity of light 34 is adjusted by controller 36, which is controlled by processor 38, to optimize photonic efficiencies under fixed conditions of applied bias, reductant and oxidant concentration, and flow rate.

Since all of the above processes are interrelated, processor 38 acts to monitor photocurrents sensed by current sensor 22 or photovoltage sensed by voltage sensor 23 from semiconductor films 14 and 16 and to adjust one or more selected parameters. Preferably processor 38 acts to determine an optimum set of parameters given the appropriate input regarding voltage bias, flow rate, light intensity, and oxygen content. By monitoring the closed circuit photocurrent between the immobilized semiconductor films 14 and 16 or open-circuit photovoltage and adjusting operating parameters described above to minimize excess charge buildup, optimal photoreactor 10 performance is maintained under a variety of changing conditions.

Figure 2:
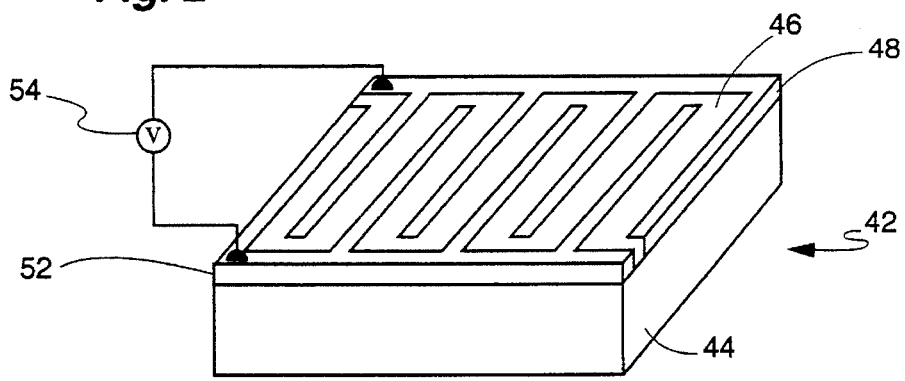
FIG. 2 is a pictorial illustration of a photoreactor according to one embodiment of the present invention.

FIGS. 2 and 3 illustrate exemplary configurations for photoreactor 10 (FIG. 1). In FIG. 2, photoreactor 42 consists of a semiconductor film 46, such as titania, deposited on a UV transparent glass substrate 44. Metallized strip electrodes 48 and 52 contact semiconductor film 46. Electrodes 48 and 52 may be deposited either on substrate 44, as shown, or may be deposited on the surface of semiconductor film 46. The surface area of the electrodes should be minimized to avoid interference with light adsorption or the reaction surface area of the semiconductor film. Electrodes 48 and 52 are interdigitated, i.e., formed in a series of interlocking "fingers." Voltage bias 54 is applied between the fingers whereby the resulting electric field is applied along semiconductor 46, i.e., parallel to substrate 44. Under these circumstances, the electric field operates to sweep excess photoexcited electrons out of the bulk of semiconductor 46, lowering recombination processes and increasing the rate of hole transfer at the interface of semiconductor 46 and a reactant. Electrode strips 48, 52 are positioned in such a way, or they are coated with an oxidation resistant insulator (not shown), so they would not be exposed to the aqueous or gaseous solution. Electrical connections are made at one end of photoreactor 42. In a complete assembly, an electrically insulating panel, insulated from photoreactor 42, may be provided to form a closed volume for contacting the surface of semiconductor 46 with a reductant and oxidant.

FIG. 3 is another embodiment of a photoreactor 56. Electrically conducting electrodes 64 are applied to the surface of semiconductor film 62, e.g., titania, supported on a substrate 58 that is UV transparent and electrically conductive. Electrodes 64 may be applied by well known processes, e.g., photolithography, and are again coated with an oxidation resistant insulator (not shown). In one embodiment an applied voltage bias 66 is applied between electrode 64 and substrate 58 so that an anodic electric field is applied across semiconductor 62, i.e., perpendicular to substrate 56 and the anodic current is collected from electrically conducting substrate 58.

It will be understood that the electrode configurations shown in FIGS. 2 and 3 may be used to provide both anodic and cathodic electric fields. A cathodic electric field is applied where reduction reactions are the desired reaction and the overall rate is limited by oxidation reactions. For example, photocatalytic destruction of certain nitrogen containing organic compounds or reduction of metal ions onto the catalyst surface is accelerated by the use of effective hole scavengers or removal of excess positive charge. Under these circumstances, the application of a cathodic bias across an n-type semiconductor film removes excess positive charge carriers from the film. The result is increased reduction rates.

An exemplary process for operating the photoreactor type I system shown in FIG. 1 is as follows.

1. Fixed Intensity
   a. Maximize sensed photocurrent by increasing reductant feed rates.
   b. Maximize sensed photocurrent by increasing oxidant feed rates.

c. Adjust voltage bias until a local maximum in detected current is sensed.

d. Repeat steps a. through c., until the photocurrent change is within acceptable range.

2. Fixed concentration of reductant (target molecules)

a. Maximize sensed photocurrent at a given voltage bias by increasing light intensity.

b. Minimize sensed photocurrent (indicative of minimal excess charging) by increasing oxidant feed rates.

c. Maximize sensed photocurrent by adjusting voltage bias.

d. Repeat steps a. through c. until photocurrent change is less than a predetermined amount.

A basic process for applying an optimum bias includes the steps of:

1. Applying bias voltage 18 to semiconductor films 14, 16.
2. Sensing an induced photocurrent in current sensor 22.
3. Increasing or decreasing voltage bias 18.
4. Sensing an induced photocurrent in current sensor 22.
5. Repeating steps 2 and 3 until an optimum current is sensed. For example, if an optimum current is a local maximum in the current, the following exemplary process will locate voltage bias 18 that produces the optimum current:

1. Apply voltage bias 18 in increasing steps until processor 38 detects a decrease in sensed photocurrent 22 in two or more successive steps.

2. Processor 38 reduces the magnitude of applied bias 18 step change in half and controls voltage bias 18 to decrease in successive steps until a photocurrent decrease is again observed in two or more successive steps.

3. Repeat step 2.

4. Processor 38 computes with a suitable curve fitting algorithm a voltage bias 18 that produces a current maximum using the voltage/current data generated in steps 1–3.

A number of suitable algorithms are available for curve fitting. For example, a third or higher polynomial might be fitted to the data. Another approach would be the inclusion of a current window, or value, that would be determined by the operator as an input to the system based on experience under a set of particular operating conditions. An increase or decrease larger than this current window would be required before the measured current would be accepted as a valid measurement. This window, in turn, would determine the magnitude of the voltage steps initially required.

In another example, where the optimum current is on a plateau, the optimal voltage bias 18 is selected close to the onset of the maximum current, i.e., the point where the current fails to change more than a pre-determined amount with an increase in applied bias 18.

1. An initial bias voltage step is inputted either by an operator or determined based on a current window selected by the operator.

2. Voltage bias 18 is increased or decreased in a stepped manner and the photocurrent is sensed by sensor 22 a certain number of times after each step change. If the standard deviation of, for example, three successive measurements is within a given tolerance, further sampling is not undertaken. If the standard deviation is outside a certain tolerance, further sampling is done to the predetermined limit of number of samples before moving to the next bias step. The failure to obtain a series of measurements within a predetermined tolerance is stored by processor 38.

3. In determining whether a current increase or decrease has been detected, the change in value must exceed a current window that is given either as input to the system or determined by the system. The system, for example, determines the appropriate current window that is required, on a periodic basis, by taking a series of measurements at the same bias level and determining standard deviations or uncertainty levels by standard statistical algorithms. An acceptable change in current is then determined by requiring an absolute change in current values greater than a value representative of a given certainty level or multiple of the standard deviation.

4. If the current is already at a maximum, a periodic check on this condition is performed by successively decreasing voltage bias 18 in a stepped manner until two or more successive decreases in current levels are detected. Voltage bias 18 is then stepped in increasing increments until two or more successive measurements with the same current value are detected. The cycle is repeated with smaller voltage steps one or more times. Processor 38 determines a maximum current and sets an optimal voltage bias, e.g., the minimum bias necessary to achieve a selected percentage of maximum current.

It will be appreciated that processor 38 may construct a learned database, i.e., operating conditions associated with key parameters, such as optimal bias settings, current values, appropriate voltage steps, and current windows. Such a stored database would be used as a starting point for system operation, but would be updated on a periodic basis to verify optimal conditions.

Other system operating variables are optimized using the basic procedures discussed above. For example, if the system is operating under reduction limited conditions, an increase in the oxidant rate may increase the interfacial charge transfer rate and, therefore, increase the measured closed circuit current under set voltage bias conditions for a type II system and increase the measured current for type I systems. Optimum conditions are iterated with voltage bias:

1. Optimize voltage bias 18, as above.

2. Adjust feed valve 28 to increase reductant 28 feed rate in stepped increments until a minimum (type I) or maximum (type II) in measured current is obtained.

3. Optimize voltage bias 18 under the new reductant 24 conditions.

A simplified method might be used for optimizing reductant (e.g., organic) concentration. For example, an approximate appropriate range of feed concentrations would be known, and step increase magnitudes and upper limits would be inputted to processor 38. Current windows would operate in manner that rejects the next stepped increase in feed concentration unless a given change in current is detected.

Since reduction may be the slowest process under normal operating conditions, the oxidation rate will be independent of reductant concentrations above a certain concentration. The most efficient degradation takes place at or near the concentration of reductant where the kinetics become zero order with respect to reductant concentration. This level will depend on the intensity of light, and the oxidant (e.g., $O_2$) concentration.

Assuming light intensity is fixed, the reductant and oxidant concentration constitute an operating loop to be optimized. Optimization of the oxidant 26 concentration (type II) or reductant concentration (type I) would proceed as follows:

1. Adjust feed valve 32 to step increase oxidant 26 feed rate.

2. Measure the current 22 after appropriate times to allow steadystate operation to be obtained.

3. Adjust feed valve 32 to step increase oxidant 26 feed rate or concentration again and measure the current 22.

4. If current increase 22 is less than a predetermined value, again step increase the oxidant 26 feed rate or concentration to verify. If the current increase 22 is greater than a predetermined value, repeat steps 1–4, above.

5. Perform steps 1–4 for oxidant 26 (type I) to optimize oxidant concentration while seeking a current minimum; optimize reductant 24 concentration (type II) while seeking a current maximum as in step 4.

6. Perform steps 1–5 again for oxidant 26.

The optimum oxidant 26 and reductant 24 feed rates will normally depend upon the intensity of light 34. All three operating variables constitute an optimization loop, e.g., as follows:

1. First optimize oxidant 26 and reductant 24, as above, with a set intensity of light 34.

2. Adjust controller 36 to step increase the intensity of light 34 a predetermined amount and measure current 22 to determine if the increase is above or below a predetermined value. If the current increase is below a predetermined value, again step increase the intensity to verify the result. If the current increase is above a predetermined value, then repeat step 1, above.

3. if the current increase is still below a predetermined value after increasing the intensity in step 2 for verification, repeat steps 1 and 2, above, for an additional verification.

As shown in FIG. 1, an anodically applied bias 18 to the $TiO_2$ surface would result in maximum current levels and corresponding reaction rates in the case where oxidation occurs at a $TiO_2$ 14 surface and reduction at a $SnO_2$ 16 surface. The system is generally applicable to aqueous or gaseous environments.

For type I systems, it will be appreciated that excess electrical charging also can be detected by measuring the open circuit photovoltage. The same principles as discussed above would apply, except that an open circuit photovoltage signal replaces the closed circuit photocurrent signal. In the context of applying a bias voltage, a bias equal in magnitude, but opposite (e.g., positive) in charge to that sensed in open circuit would be applied to sweep out excess charge. In the photovoltage embodiment, photovoltage is sensed in isolation from, and simultaneously with, the application of bias.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. In a photocatalysis system for degrading toxic compounds to constituent components, an improved photoreactor control system for optimized reaction rates on the surface of a wide bandgap semiconductor electrode material having a first surface exposed to light having a higher energy than said bandgap and a second surface exposed to said toxic compound, the improvement comprising:

an electrical conductor contacting said semiconductor electrode material in a geometry effective to produce an electric field within said semiconductor material;

a controlled voltage source connected to said electrical conductor for applying a voltage bias effective to produce said electric field;

a closed circuit current sensor or open circuit voltage sensor connected to said electrical conductor for outputting a current or voltage signal, respectively, indicative of an excess electrical charge in said semiconductor material; and a processor for monitoring said current or said voltage signal and controlling said voltage source to minimize said excess electrical charge.

2. An improved photoreactor control system according to claim 1, wherein said semiconductor electrode material forms an isolated electrode surface.

3. An improved photoreactor control system according to claim 2, further including:

controlled feed means for oxidant feed and reductant feed to said semiconductor surface;

wherein said processor outputs a control signal to said feed means for adjusting feed rates of said oxidant feed and said reductant feed to minimize said photocurrent or said open circuit voltage at a given value of said voltage bias and light intensity.

4. An improved photoreactor control system according to claim 2, further including:

a light controller for adjusting an intensity of said light;

wherein said processor outputs a control signal to said light controller to minimize said photocurrent or said open circuit voltage at a given value of said voltage bias.

5. An improved photoreactor control system according to claim 3, further including:

a light controller for adjusting an intensity of said light;

wherein said processor outputs a control signal to said light controller to minimize said photocurrent at a given value of said voltage bias and said reductant and oxidant feed rates.

6. An improved photoreactor control system according to claim 1, wherein said semiconductor electrode material forms a photoreactor cell.

7. An improved photoreactor control system according to claim 6, further including:

controlled feed means for oxidant feed and reductant feed to said semiconductor surface;

wherein said processor outputs a control signal to said feed means for adjusting feed rates of said oxidant feed and said reductant feed to maximize said photocurrent or said open circuit voltage at a given value of said voltage bias and light intensity.

8. An improved photoreactor control system according to claim 6, further including:

a light controller for adjusting an intensity of said light;

wherein said processor outputs a control signal to said light controller to maximize said photocurrent or said open circuit voltage at a given value of said voltage bias.

9. An improved photoreactor control system according to claim 7, further including:

a light controller for adjusting an intensity of said light;

wherein said processor outputs a control signal to said light controller to maximize said photocurrent at a given value of said voltage bias and said reductant and oxidant feed rates.

10. In a photocatalysis system for degrading a toxic material, an improved photoreactor control system for increased reaction rates on the surface of a wide bandgap semiconductor material exposed to light having a higher energy than said bandgap and a surface exposed to said toxic compound, the improvement comprising:

an electrical conductor contacting said semiconductor material in a geometry effective to produce an electric field within said semiconductor material;

one or more controllers for controlling one or more associated parameters of said photocatalysis system that affect excess electronic charge on said semiconductor surface;

a sensor connected to said electrical conductor for outputting a closed circuit current or open circuit voltage signal indicative of the excess electrical charge in said semiconductor material; and a processor for monitoring said current or said voltage signal and outputting one or more control signals to said one or more controllers to adjust said associated parameters to optimize said current or said voltage.

11. The improved photoreactor control system according to claim 10, wherein said parameters are selected from the group consisting of voltage bias across said semiconductor film, stream flow rate, reductant concentration, oxidant concentration, and light intensity.

12. In a photocatalysis system for degrading a toxic material, an improved process for photoreactor control to optimize reaction rates on the surface of a wide bandgap semiconductor material exposed to light having a higher energy than said bandgap and a surface exposed to said toxic compound, the improvement process comprising:

contacting said semiconductor material with an electrical conductor in a geometry effective to produce an electric field within said semiconductor material;

controlling one or more associated parameters of said photocatalysis system that affect excess electronic charge within said semiconductor surface;

outputting a closed circuit current or open circuit voltage signal from said electrical conductor indicative of excess electrical charge in said semiconductor material; and monitoring said current or said voltage signal in a processor; and outputting one or more control signals from said processor to said one or more controllers to adjust said associated parameters to minimize excess electrical charge.

13. The improved process for photoreactor control of claim 12, wherein the step of outputting one or more control signals includes the step of outputting control signals to process parameters selected from the group consisting of voltage bias across said semiconductor film, light intensity, stream flow rate, reductant concentration, oxidant concentration, and light intensity.

14. The improved process for photoreactor control of claim 12, wherein the step of outputting one or more control signals includes a first step of selecting a minimum voltage bias to maximize said photocurrent.

15. The improved process for photoreactor control of claim 14, wherein the step of outputting one or more control signals includes a second step of controlling an oxidant feed flow rate to maximize said photocurrent at a selected value for said voltage bias.

16. The improved process for photoreactor control of claim 15, wherein the step of outputting one or more control signals includes a third step of controlling a reductant feed flow rate to minimize said photocurrent at selected values for said voltage bias, light intensity, and said oxidant feed flow rate.

17. The improved process for photoreactor control of claim 15, of controlling said light intensity to maximize said photocurrent at a selected value for said voltage bias.

18. In a photocatalysis system for degrading a toxic compound, an improved photoreactor for optimizing reaction rates on the surface of a wide bandgap semiconductor exposed to light having a higher energy than said bandgap and a surface exposed to said toxic compound, the improvement comprising:

an electrical conductor contacting said semiconductor material in a geometry effective to produce an electric field within said semiconductor material in response to an applied voltage bias.

19. An improved photoreactor according to claim 18, wherein said geometry of said electrical conductor is a series of interdigitated electrode fingers whereby said voltage bias is applied across said fingers to produce an electric field along said semiconductor.

20. An improved photoreactor according to claim 18, wherein said geometry of said electrical conductor is a series of conductive strips contacting said semiconductor supported on a UV transparent and electrically conductive substrate, whereby said voltage bias is applied between said electrical conductor and said substrate to produce an electric field across said semiconductor material.

* * * * *